US009014618B2

United States Patent
Chami et al.

(10) Patent No.: US 9,014,618 B2
(45) Date of Patent: Apr. 21, 2015

(54) BASE STATION REPEATER

(75) Inventors: Youssef Chami, Newbury (GB); Allan Bartlett, Newbury (GB)

(73) Assignee: Vodafone Group PLC, Newbury (GB)

( * ) Notice: Subject to any disclaimer, the term of this patent is extended or adjusted under 35 U.S.C. 154(b) by 645 days.

(21) Appl. No.: 12/312,996

(22) PCT Filed: Dec. 4, 2007

(86) PCT No.: PCT/GB2007/004646
§ 371 (c)(1),
(2), (4) Date: Aug. 4, 2009

(87) PCT Pub. No.: WO2008/068479
PCT Pub. Date: Jun. 12, 2008

(65) Prior Publication Data
US 2010/0009625 A1  Jan. 14, 2010

(30) Foreign Application Priority Data

Dec. 4, 2006  (GB) .................... 0624218.4
Apr. 5, 2007  (GB) .................... 0706782.0

(51) Int. Cl.
*H04B 7/15* (2006.01)
*H04B 7/155* (2006.01)
(Continued)

(52) U.S. Cl.
CPC .......... *H04B 7/15535* (2013.01); *H04B 7/2606* (2013.01); *H04W 52/146* (2013.01);
(Continued)

(58) Field of Classification Search
CPC ............. H04B 7/2606; H04B 7/15535; H04B 7/15578; H04B 17/02; H04W 52/46; H04W 52/146; H04W 52/245; H04W 52/247; H04W 52/287
See application file for complete search history.

(56) References Cited

U.S. PATENT DOCUMENTS 4,742,514 A * 5/1988 Goode et al. ................. 370/280
5,504,803 A * 4/1996 Yamada et al. ............ 455/426.1
(Continued)

FOREIGN PATENT DOCUMENTS

EP  1022849 A2  7/2000
WO  WO97/33381  9/1997
(Continued)

OTHER PUBLICATIONS

3GPP TS 25.214 V7.4.0 (Mar. 2007), Technical Specification, 3rd Generation Partnership Project; Technical Specification Group Radio Access network; Physical layer procedures (FDD) (Release 7), 76 pp.

*Primary Examiner* — Fanghwa Wang
(74) *Attorney, Agent, or Firm* — Knobbe, Martens, Olson & Bear LLP

(57) ABSTRACT

A cellular telecommunications network base station repeater for a mobile terminal in a network having a power control function causes, during an active communication session, mobile terminal uplink transmit power to decrease in response to an increase in signal strength of the received uplink signal. The gain of the repeater is increased in response to an increase in the uplink signal received at the repeater above a threshold, and subsequently decreasing the gain until the measured power in the received uplink signal exceeds the threshold. Due to the power control function, increasing the gain causes the transmit power of the mobile terminal, and hence the uplink signal received at the repeater, to decrease. Decreasing the gain causes the transmit power, and hence the received uplink signal, to increase. The threshold not being exceeded is indicative of the communication no longer being active, and the repeater will eventually deactivate.

22 Claims, 5 Drawing Sheets

(51) Int. Cl.
*H04B 7/26* (2006.01)
*H04W 52/14* (2009.01)
*H04W 52/24* (2009.01)
*H04W 52/28* (2009.01)
*H04W 52/46* (2009.01)

(52) U.S. Cl.
CPC .......... *H04W52/245* (2013.01); *H04W 52/247* (2013.01); *H04W 52/287* (2013.01); *H04W 52/46* (2013.01); *Y02B 60/50* (2013.01)

(56) References Cited

U.S. PATENT DOCUMENTS

| | | | |
|---|---|---|---|
| 5,809,398 | A | 9/1998 | Moberg et al. |
| 6,353,729 | B1 | 3/2002 | Bassirat |
| 6,459,881 | B1 | 10/2002 | Hoder et al. |
| 6,804,491 | B1 | 10/2004 | Uesugi |
| 7,751,778 | B1* | 7/2010 | Ngan ............................ 455/11.1 |
| 8,014,737 | B2* | 9/2011 | Pratt et al. ................... 455/127.1 |
| 2002/0052179 | A1* | 5/2002 | Hwang et al. ................. 455/11.1 |
| 2003/0123401 | A1* | 7/2003 | Dean ............................. 370/318 |
| 2003/0214919 | A1 | 11/2003 | Kilfoyle et al. |
| 2004/0219876 | A1* | 11/2004 | Baker et al. ......................... 455/7 |
| 2004/0235417 | A1 | 11/2004 | Dean |
| 2005/0009483 | A1* | 1/2005 | Eilts et al. ...................... 455/136 |
| 2005/0152321 | A1* | 7/2005 | Maufer et al. ................. 370/338 |
| 2005/0176368 | A1* | 8/2005 | Young et al. ................. 455/11.1 |
| 2006/0205341 | A1 | 9/2006 | Runyon |

FOREIGN PATENT DOCUMENTS

| | | |
|---|---|---|
| WO | WO03/073643 A1 | 9/2003 |
| WO | WO 2004/036513 A1 | 4/2004 |

* cited by examiner

BASE STATION REPEATER

TECHNICAL FIELD

This application relates to a method of operating a cellular telecommunications network base station repeater and also relates and to a repeater.

BACKGROUND TO THE INVENTION

Providing good quality radio coverage in a mobile or cellular telecommunications network using a macro network is very expensive due to the short range of the signals from base stations.

Many geographical areas covered by radio networks experience poor network coverage due to the local terrain or buildings.

Additionally, indoor users can experience particularly poor coverage due to the penetration losses of the radio signals through walls. Analysis shows that up to 70% of mobile terminal users are located indoors. A high percentage of these users suffer from poor coverage which will impact mobile terminal battery life, user throughput and network performance and efficiency. Providing indoor coverage of UMTS is particularly difficult due to the high frequency, and, hence, high penetration losses, of the UMTS signals.

It is desirable to improve the quality of the coverage throughout the coverage areas and, in particular, to boost the power of the network signals in order that the signals can penetrate into buildings.

One solution to improving the coverage and local power of the signals is to increase the density of the deployed (macro) base stations. However, this is a very expensive solution.

An alternative solution for improving coverage is to boost the signal locally using dedicated repeaters. Typically, repeaters act as simple amplifiers to amplify and transmit all signals that they receive. Repeaters transmit all signals and so will amplify both uplink and downlink signals.

Although repeaters can help to provide network coverage in areas not covered by the macro network and boost the power of signals, the use of repeaters cause particular problems in the uplink direction. Since a large portion of the signals received by a repeater are noise, for example downlink signals or general background radio signals from distant cells or devices, a large part of the network capacity in the uplink is wasted as it is occupied by signals amplified by the repeater and which are not useful to the network in the uplink.

BRIEF SUMMARY OF THE INVENTION

According to the system described herein, a method is provided of operating a cellular telecommunications network base station repeater for a mobile terminal in a cellular telecommunications network, which network has a power control function which during an active communication tends to cause the mobile terminal uplink transmit power to vary in response to a variation in signal power of the uplink signal associated with that mobile terminal received at the network. The method includes varying the gain of the repeater to cause the power control function to consequently vary the mobile terminal uplink transmit power, and deactivating the repeater when the consequential variation in the mobile terminal uplink power does not occur.

The active communication may be a circuit switched voice call or packet switched data session.

In contrast to the prior art, where a repeater is operated at a constant, fixed gain in the uplink, in an embodiment of the system described herein, the repeater is only activated periodically. During an active communication of the mobile terminal the gain of the repeater is deliberately varied, which causes the variation of signal power of the uplink signal associated with that mobile terminal received at the network (the signal received at the network (base station) will generally be the associated amplified signal of the repeater rather than the signal of the mobile terminal itself). In accordance with the power control function of the network, the mobile terminal is then instructed to vary its uplink transmit power. The repeater monitors the signals that it receives, which will include the mobile terminal uplink transmit signals, to detect the occurrence of these variations in accordance with instructions issued by the power control function. If the variations are not detected by the repeater, this is indicative of the communication no longer being active (the power control function only operates during an active communication). Consequently, the repeater is deactivated. On the other hand, if the variations are detected, the repeater is not deactivated and the repeater amplifies the uplink signal from the mobile terminal, thereby increasing communication quality.

Therefore, advantageously, the embodiment provides a repeater which becomes deactivated when a communication becomes inactive. This deactivation occurs automatically, and does not require any adjustments to the structure of the signalling transmitted by the mobile terminal or telecommunications network. Instead, the existing power control function of the network is exploited to determine when the communication is active and inactive. By deactivating the repeater when not required, the overall interference is reduced, improving the quality of service provided by the communication network and also reducing power consumption of the repeater.

Advantageously, the repeater is activated in response to detection of a signal indicative of an active communication of the mobile terminal, and amplifies signals at a predetermined gain after activation. This predetermined gain may be the optimal gain—for example the maximum gain. For example, the repeater may be activated when the detected signal exceeds a first threshold for a first time period. In the embodiment the gain of the repeater is maintained at the predetermined gain until the detected signal falls below a second threshold. When the detected signal falls below the second threshold, the repeater gain is progressively reduced—for example, in a series of stepped reductions. In the embodiment the progressive reduction of repeater gain stops when the detected signal exceeds a threshold (which may be the same threshold at which the repeater is activated). When the detected signal exceeds the threshold, the repeater reverts to optimum or maximum gain and the gain of the repeater is subsequently progressively reduced.

During active communication, when the power control function is operative, these steps will be repeated in cycles. The reduction in gain of the repeater reduces the power of the uplink signal received at the network and causes the power control function of the network to instruct the mobile terminal to increase its uplink transmit power. The increase in the uplink transmit power is detected by the repeater (the threshold is exceeded), and the repeater than reverts back to optimal maximum gain.

However, this cycle is broken when the active communication ends and the power control function consequently no longer operates. The progressive reduction in gain of the repeater does not then cause the power control function in the network to issue instructions to the mobile terminal to increase its uplink transmit power. In the absence of detection of this increase in uplink transmission power of the mobile terminal by the repeater, the gain of the repeater is progressively reduced to zero, and the repeater is then deactivated.

According further to the system described herein, a method is provided of operating a cellular telecommunications network base station repeater for a mobile terminal in a cellular telecommunications network, which network has a power control function which tends to cause the mobile terminal uplink transmit power to decrease in response to an increase in signal power of the uplink signal associated with that mobile terminal received from the network and tends to cause the mobile terminal uplink transmit power to increase in response to a decrease in the signal strength of the uplink signal associated with that mobile terminal received at the network. The method includes increasing the gain of the repeater in response to an increase in power of a signal received at the repeater above a threshold, and subsequently decreasing the gain of the repeater until the power of the signal received at the repeater exceeds a threshold.

According further to the system described herein, a method is provided of operating a cellular telecommunications network base station repeater for a mobile terminal in a cellular telecommunications network, which network has a power control function which during an active communication tends to cause the mobile terminal uplink transmit power to decrease in response to an increase in signal power of the uplink signal associated with that mobile terminal received at the network and tends to cause the mobile terminal uplink transmit power to increase in response to a decrease in signal strength of the uplink signal associated with that mobile terminal received at the network. The method includes activating the repeater in response to detection of a signal indicative of an active communication of the mobile terminal to amplify the signal with a predetermined gain, reducing the gain of the repeater such that the power control function causes the mobile terminal to increase its uplink transmit power during the active communication, M and detecting the absence of the increase in uplink transmit power of the mobile terminal as an indication that the communication is no longer active and in response to the detection deactivating the repeater.

According further to the system described herein, a base station repeater for a mobile terminal in a cellular telecommunications network includes features to perform the above-noted methods.

The cellular telecommunications network may be a GSM, GPRS or UMTS network, for example, and is preferably a CDMA network.

BRIEF DESCRIPTION OF THE DRAWINGS

Embodiments of the system described herein will now be explained by way of example, with reference to the accompanying drawings, in which.

In the drawings like elements are designated with the same reference signs.

DETAILED DESCRIPTION OF VARIOUS EMBODIMENTS

Some elements of a conventional mobile or cellular network will now be briefly described with reference to FIG. 1.

Figure 1:
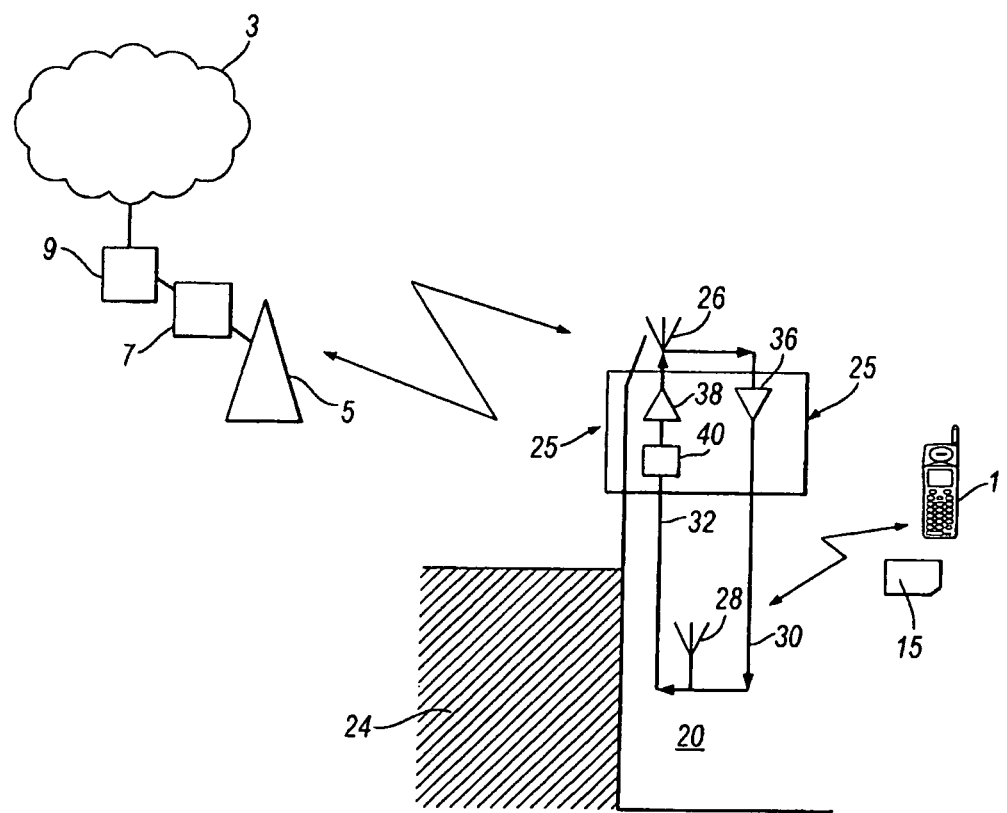
FIG. 1 shows schematically a repeater for use with a mobile telecommunications network in accordance with an embodiment of the system described herein.

FIG. 1 shows schematically a mobile or cellular network.

Mobile terminal 1 is registered with GSM/GPRS or UMTS (3G) mobile telecommunications network 3. The mobile terminal 1 may be a handheld mobile telephone, a personal digital assistant (PDA) or a laptop computer equipped with a datacard. The mobile terminal 1 communicates wirelessly with mobile telecommunications network 3 via the radio access network (RAN) of the mobile telecommunications network 3, comprising, in the case of a UMTS network, base station (Node B) 5, and radio network controller (RNC) 7. Communications between the mobile terminal 1 and the mobile telecommunications network 3 are routed from the radio access network via GPRS support nodes (SGSN) 9, which may be connected by a fixed (cable) link to the mobile telecommunications network 3.

In the conventional manner, a multiplicity of other mobile terminals (not shown) are registered with the mobile telecommunications network 3.

The mobile telecommunications network 3 includes a gateway GPRS support node (GGSN) which enables IP-based communications with other networks, such as the Internet or other IP network via an appropriate link.

Each of the mobile terminals 1 is provided with a respective subscriber identity module (SIM) 15. During the manufacturing process of each SIM, authentication information is stored thereon under the control of the mobile telecommunications network 3. The mobile telecommunications network 3 itself stores details of each of the SIMs issued under its control. In operation of the mobile telecommunications network 3, the terminal 1 is authenticated (for example, when the user activates the terminal in the network with a view to making or receiving calls) by the network sending a challenge to the terminal I incorporating a SIM 15, in response to which the SIM 15 calculates a reply (dependent on the predetermined information held on the SIM—typically an authentication algorithm and a unique key Ki) and transmits it back to the mobile telecommunications network 3. The mobile telecommunications network 3 includes an authentication processor which generates the challenge and which receives the reply from the terminal 1.

Using information pre-stored concerning the content of the relevant SIM 15, the authentication processor calculates the expected value of the reply from the mobile terminal 1. If the reply received matches the expected calculated reply, the SIM 15 and the associated mobile terminal are considered to be authenticated.

The SIM 15 used by the terminal 1 may be a SIM of the type defined in the GSM or UMTS standards specifications, or may be a simulation of a SIM—that is, software or hardware that performs a function corresponding to that of the SIM. The SIM may be in accordance with the arrangement described in WO-A-2004 036513.

As mentioned above, in some locations communication with the base station 5 of the network 3 with which the mobile terminal 1 is registered cannot be satisfactorily performed. Such a situation is shown in FIG. 1, where the mobile terminal 1 is located in the basement 20 of a building 22. The ground 24 surrounding the basement attenuates signals transmitted between the base station 5 and the mobile terminal 1 such that any signals which are received by the base station 5 and mobile terminal 1 are so weak that satisfactory communication between the base station 5 and the mobile terminal 1 cannot be performed.

A repeater 25 according to an embodiment of the invention is provided, including a repeater antenna 26 is provided at a position on the building 22 which is such that communications can satisfactorily be transmitted between the repeater antenna 26 and the base station 5. The repeater antenna 26 is electrically coupled to a supplementary antenna 28 located in the basement 20 by cable 30, which feeds downlink signals received from the base station 5 by the repeater antenna 26 to the supplementary antenna 28. The supplementary antenna 28 communicates wirelessly with the mobile terminal 1 located in the basement 20 using GSM or UMTS transmission protocols. Downlink signals received by the mobile terminal 1 from the supplementary antenna 28 appear to the mobile terminal 1 as if they were received directly from the base station 5.

Uplink signals received from the supplementary antenna 28 from the mobile terminal 1 are communicated to the repeater antenna 26 by cable 32. These signals received by the antenna 28 are then transmitted by the repeater antenna 26 to the base station 5.

The repeater 25 is provided which includes a downlink amplifier 36 and an uplink amplifier 38. The downlink amplifier 36 amplifies signals received by repeater antenna 26 as they are transmitted to the supplementary antenna 28 by cable 30. The uplink amplifier 38 amplifies signals received by the supplementary antenna 28 as they are passed to the repeater antenna 26 via cable 32.

The amplifiers 36,38 of the repeater 25 each amplify a frequency band (range). In a GSM and/or UMTS mobile telecommunications network the frequency of downlink transmissions from the base station 5 and neighboring base stations are selected to be different so that each of the base stations can all operate effectively. The downlink signaling from the base station 5 provides the repeater 25 with an indication of the downlink frequency band used by the base station 5. This enables the repeater 25 to configure the downlink amplifier 36 to amplify (only) that downlink frequency band. In UMTS the downlink and uplink. frequency bands are paired. Thus, if the downlink frequency band is known, the associated uplink frequency can be determined. By using knowledge of the downlink frequency band, the repeater 25 configures the uplink amplifier 38 to amplify the relevant uplink frequency band.

The downlink amplifier 36 operates at a constant, fixed gain.

In a UMTS mobile communication system using (and other CDMA Systems), power control plays an important role in system performance. Power control is needed both in the uplink and downlink directions. On the uplink, the aim is to receive all signals in a base station with the same signal power. Without power control, mobile terminals close to a base station would dominate in signal strength mobile terminals located further away from the base station. In UMTS systems, signals sent by one base station are orthogonal with each other but reflections of signals and signals sent by other base stations cause interference, which is why power control is needed also in the downlink direction.

Uplink power control in UMTS systems includes inner loop and outer loop power control. The function of the inner loop power control is to maintain uplink signal quality at a defined target value, such as a Signal to Interference Ratio (SIR). The outer loop power control tries to maintain the desired quality performance of the received transport channel at a defined quality target by adjusting the inner loop SIR target in dependence upon the bearer service quality requirement.

Uplink power control will now be described with reference to FIG. 2. The serving Node B 5 estimates the SIR (at 50) of the received uplink DPCH (Dedicated Physical Channel) 52 from the mobile terminal 1. If (at 54) the SIR of the received DPCH 52 at the serving Node B 5 for the mobile terminal 1 is above the target SIR, the Node B5 issues (at 56) a Transmit Power Control (TPC) command 57 to the mobile terminal 1 in the downlink 58 to reduce its output power. Likewise, if (at 54) the SIR of the received DPCH at the base station is calculated to be below the target, the Node B 5 issues a TPC 57 command to the mobile terminal I to increase its output power. The mobile terminal 1 analyses (at 60) the TPC command 57 received in the downlink 58 and adjusts (at 62) its transmit power accordingly. The Node B 5 generates TPC commands and transmits the commands once per time slot.

The uplink outer loop power control is used to maintain the quality of communication at the level of bearer service quality requirement, while using as low power as possible. The uplink outer loop power control is responsible for setting the target SIR in the Node B 5 for each individual uplink inner loop power control. This target SIR is updated for each mobile terminal according to the estimated uplink quality (Bit Error Rate, BER) for each Radio Resource Control connection. The RNC 7 estimates the BER (at 64) and uses this estimation to set the target SIR (at 66). The target SIR is that transmitted to the Node B 5 for use in the comparison step (at 54).

Figure 3:
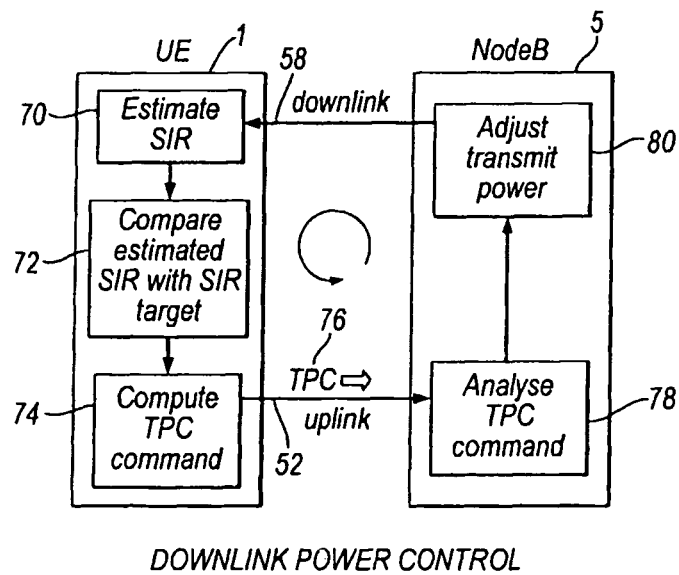
FIG. 3 shows the downlink power control functions of a UMTS network.

Downlink power control will now be described with reference to FIG. 3 the mobile terminal 1 estimates the SIR (at 70) of the downlink 58. The mobile terminal 1 then compares the estimated SIR with a target SIR (at 72). This target SIR is provided to the mobile terminal 1 by one of the known mechanisms (this can be considered to be a downlink outer loop power control). If (at 72) the estimated SIR is above the target SIR, the mobile terminal 1 issues (at 74) a TPC command 76 to the node B 5 to reduce its transmit power. Likewise, if the SIR is below the target SIR, the mobile terminal 1 issues (at 74) a TPC command 76 to the node B 5 to increase its transmit power. The node B 5 analyses (at 78) the TPC command 76 received in the uplink 52 and adjusts (at 80) its transmit power accordingly. The TPC command 76 is sent in the uplink 52 in the DPCCH (Dedicated Physical Control Channel). The node B 5 then adjusts the downlink 58 DPDCH (Dedicated Physical Data Channel) accordingly.

The above explanation of power control is intended to be a brief explanation of conventional power control performed in UMTS cellular networks. The power control only operates during an active communication session. The operation of such power control will be known to those skilled in the art, and is described in 3GPP TS 25.214—which is fully incorporated herein by reference.

As indicated above, the downlink amplifier 36 operates at a constant, fixed gain. In accordance with an important feature of the embodiment of the invention, the uplink amplifier 38 is controlled to operate at a variable gain or not to provide any gain at all.

Figure 4:
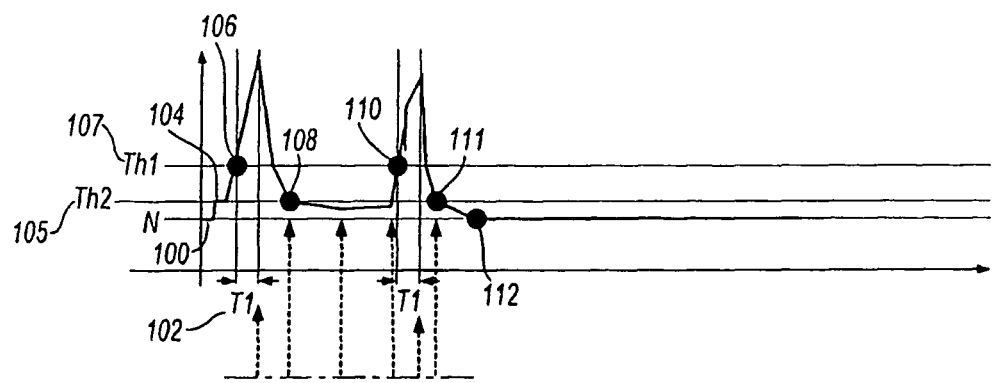
FIG. 4 is a graph showing received signal power at the repeater against time.

FIG. 4 shows the Random Access Channel (RACH) power of the signals received at the antenna 28 against time. Power in db is indicated in the vertical scale and time is indicated in the horizontal scale. The power indicated is the power in the uplink frequency band selected for the base station 5. Uplink processor 40 includes a filter that filters out signals in other frequency bands. At the antenna 28 there is an ambient noise level N, generated by various sources of electromagnetic radiation. The uplink processor 40 detects the signal received in the relevant frequency band, including the ambient noise.

Figure 5:
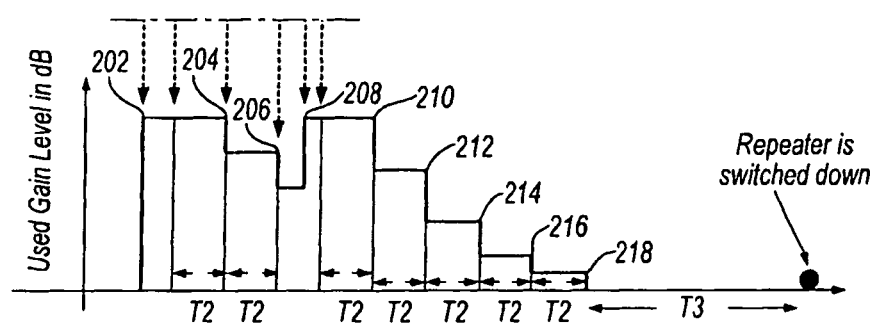
FIG. 5 is a graph showing repeater gain against time, the timescales of the graphs of FIG. 4 and FIG. 5 being the same.

FIG. 5 shows the gain of the uplink amplifier 38 against time. Gain in dB is indicated in the vertical scale and time is indicated in the horizontal scale. The time scales of FIGS. 4 and 5 are the same. Simultaneous events in the graphs are indicated by the dashed arrows.

Figure 6:
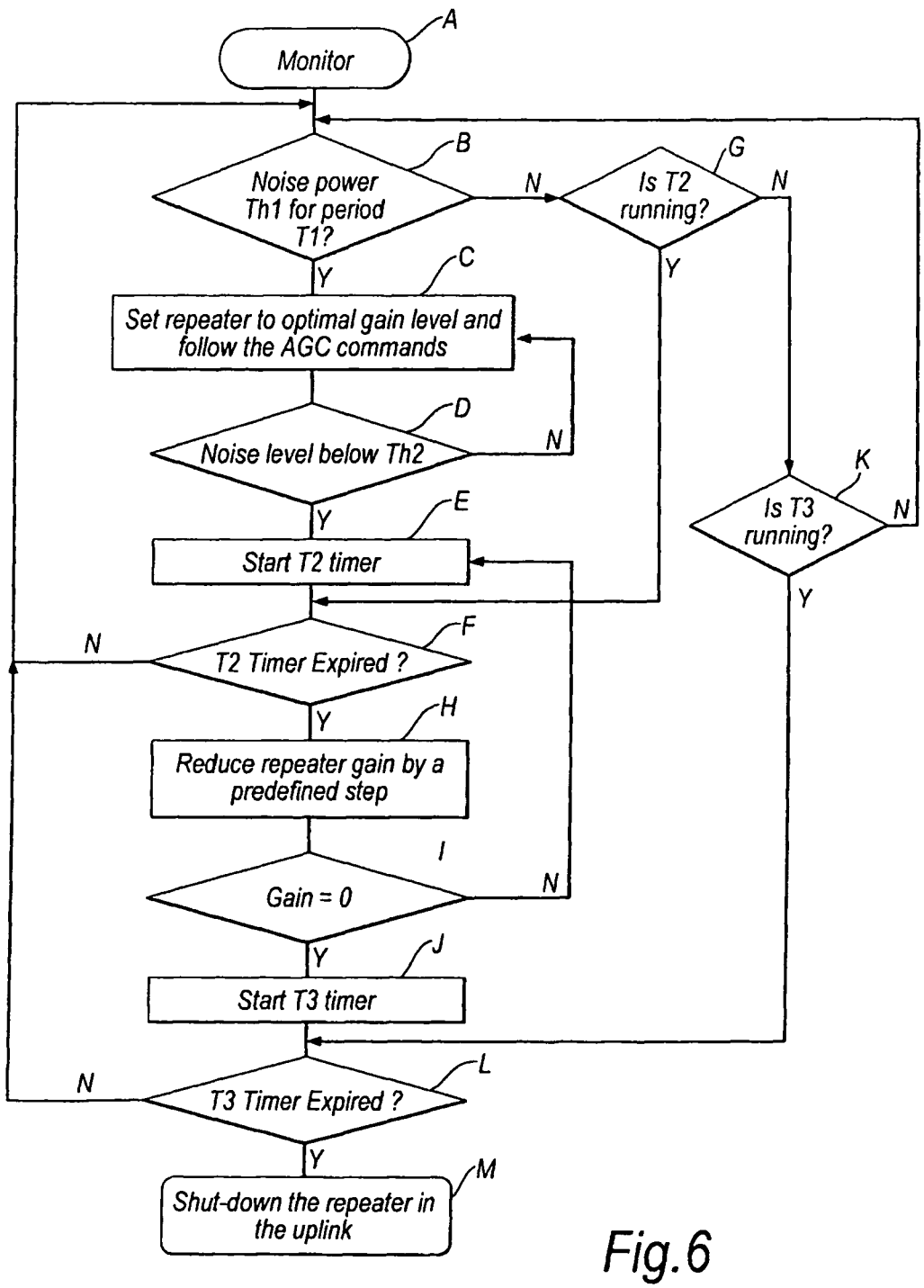
FIG. 6 shows a flow chart explaining the operation of the repeater in accordance with the embodiment.

FIG. 6 shows a flow chart which will now be used to explain how the gain of the uplink amplifier 38 is controlled or adjusted.

The uplink processor 40 monitors the RACH power received at the antenna 28 at step A. At this point the uplink amplifier 38 is shut down (its gain is set to 0). This is represented by the region 100 of the graph 5.

At step B the power of the signal received at antenna 28 is analyzed to determine whether the power is greater than a first threshold Th1 107 for a time period T1 102, which may be, for example, a multiple of the time-to-interval (TTI).

In the graph of FIG. 4 at time 100 no active communications are occurring in the region of the antenna 28. Therefore the power received corresponds to the ambient noise level N. At the point indicated at 104 an active call (communication session) is initiated. The power of the signal received at the antenna 28 therefore increases as a result of the signals transmitted by the mobile terminal 1. In accordance with the known power control procedures, the mobile terminal initially broadcasts in the uplink at a relatively low power. The uplink inner power control loop described with reference to FIG. 2 is activated during the call and results in TPC commands 57 being issued (at 56) in the downlink 58 to the mobile terminal 1 which after analysis (at 60), cause the mobile terminal 1 to increase its transmit power (at 62) in the uplink (52). The transmit power is increased on each iteration of the power control loop until the estimated SIR reaches the target SIR (at 54). This can be seen in FIG. 4 as the power increases from a lower threshold Th2 105 to the higher threshold Th1 107 and continues to increase. The higher threshold Th1 107 is crossed at point 106. When it is determined at step B that the noise power has exceeded the threshold Th1 105 for the time period T1, then at step C the uplink processor 40 switches the uplink amplifier 38 to the optimum gain level—for example, maximum gain—as shown at 202 in FIG. 5.

The amplified uplink signals from the mobile terminal 1, received by the antenna 28 are therefore amplified at high gain by uplink amplifier 38 and are transmitted from antenna 26. The signal received at the node B 5 will therefore be the amplified signal from the antenna 26, which is equivalent to the signal received by the antenna 28 but significantly amplified. The amplification of the signal will generally result in the SIR received in the uplink by the node B 5 being significantly higher than the signal received directly from the mobile terminal 1 prior to activation of the uplink amplifier 38. The SIR of the uplink signal is estimated at 50 (FIG. 2). The comparison step 54 will identify that the estimated SIR is greater than the target SIR, and consequently at step 56 at TPC command 57 will be issued in the downlink 58 to reduce the transmit power. This signal is received in downlink by antenna 26 and is amplified at fixed gain by downlink amplifier 36, and then transmitted from antenna 28 to the mobile terminal 1. The mobile terminal 1 analyses the received TPC command 57 at step 60 and reduces its transmit power at step 62 in accordance with the received TPC command 57. The inner power control loop of FIG. 2 is performed repeatedly, repeatedly reducing the transmit power of the mobile terminal 1 until the estimated SIR value calculated at step 50 equals the target SIR value.

The consequent reduction from the peak value of the power measured at antenna 28 can be seen in the graph of FIG. 4. At step D of the flow chart it is determined when the power received at antenna 28 falls below the lower threshold Th2, 105, at point 108. When the noise level falls below the threshold Th2, 102, at step E, a timer that times a period T2 is started.

A timer then counts the period T2, and whilst at step F it is determined that T2 has not been reached, step B is performed to determine again whether the noise power exceeds the higher threshold Th1 107 for the first time period T1. In the example shown in FIG. 4 the noise power does not exceed the higher threshold Th1 107 at the current time. Therefore, at step G it is determined whether the timer is counting period T2, which it is in this instance. At step F it is again determined whether the timer T2 has expired. The loop of steps F,B and G is repeated until the timer T2 has expired, whereafter step H is performed and the gain of the uplink amplifier 38 is reduced by a predetermined value (it is stepped down), as shown at 204.

The reduction in the gain of the uplink amplifier 38 reduces the strength of the signal received at the node B 5, and in general will decrease the SIR. This is detected at step 50 of the uplink power control in a loop (FIG. 2). When the estimated SIR of the received uplink 52 is compared with the target SIR at step 54 it is then determined that the estimated SIR of the uplink 52 is below the target value. Consequently, at step 56 TPC command 57 is generated and sent in the downlink 52 to cause the mobile terminal 1 to increase its transmit power. The TPC command 57 is received by the antenna 26, is amplified by fixed gain downlink amplifier 36 and is then transmitted by the transmitter 28 to the mobile terminal 1. The mobile terminal 1 then analyses the TPC command at step 60 and increases its transmit power at step 62.

At step I it is determined whether the gain of the uplink amplifier is set to zero. If it is determined at step I that the gain is not zero, then step E is performed and the timer to time the period T2 is restarted. The loop of steps F,B and G is repeated until the timer T2 has expired. Step H is then repeated and the gain of the uplink repeater amplifier 38 is reduced again by the predetermined step at 206. At step I it is determined whether the gain of the uplink amplifier 38 is set to zero. As the gain is not set to zero, step F is then performed with the timer T2 being restarted. The loop of steps F,B and G is then repeated. However, because the gain of the uplink amplifier 38 has been reduced, the SIR of the uplink 52 estimated by the node B 5 at step 50 will decrease, compared to the target SIR. This causes the node B 5 to generate TPC command 57 which causes the mobile terminal to increase its transmit power. The increase in transmit power of the mobile terminal increases the power received at the antenna 28, and this is represented in FIG. 4 where the signal power initially increases above the lower threshold Th2, 105, and then exceeds the higher threshold Th1, 107 at point 110. This starts the timer of period T1 in step B. When it is determined at step B that the higher threshold Th1, 107, has been exceeded for the time period T1, step C is then performed and the uplink amplifier 38 again increases to its optimal gain level (typically maximum gain), as shown at point 208.

Figure 2:
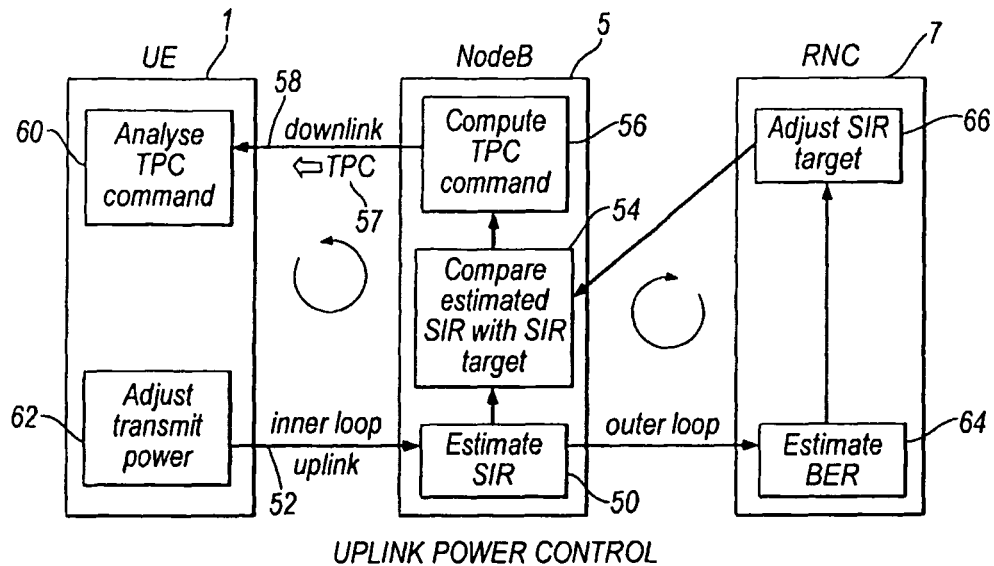
FIG. 2 shows the uplink power control inner loop and outer loop functions of a UMTS network.

The increasing gain of the uplink amplifier 38 results in a higher power signal being received by the node B 5, which will typically have a higher SIR in the uplink, which is estimated at step 50 (FIG. 2). When it is determined that the estimated SIR exceeds the target SIR at step 54, a TPC command 57 is generated at step 56 and sent in the downlink 58. This TPC command is received by the antenna 26, amplified by the fixed gain downlink amplifier 36, and transmitted to the mobile terminal 1 via the antenna 28. The TPC command 57 is analyzed by the mobile terminal 1 at step 60 and causes the mobile terminal to reduce its transmit power at step 62. This reduction in transmit power of the mobile terminal reduces the power of the signals received at the antenna 28, and this is represented in the decrease in power shown in the graph of FIG. 4.

The steps of the flow chart of FIG. 6 continue to be performed. It is determined at step D when the noise level falls below threshold Th2 105 at point 111. When threshold Th2 105 is crossed, at step F, the timer begins to time period T2. The loop of steps F,B and G is repeated. Because the active communication session is terminated at point 112 the power received at the antenna 28 does not exceed the threshold Th1 107 (the power received will be minimal, being as a consequence of ambient noise only).

When it is determined that the timer T2 has expired at step F, the gain of the uplink amplifier 38 is reduced at point 210. It is then determined whether the gain of the uplink amplifier 38 is zero at step I. Whilst the gain of the uplink amplifier 38 is not zero, the timer of the period T2 is restarted at step E and the loop of steps F,B and G is repeated until the timer T2 expires. Each time the timer T2 expires the gain of the uplink repeater amplifier 38 is reduced at steps 212,214,216 and 218.

When the gain of the uplink amplifier 38 is determined to be zero at step I, a timer for period T3 starts at step J. During the period T3 step B is performed. Because at step B it is determined that the signal received by the antenna 38 is not greater than the threshold Th1, 107, step G is then performed. At step G it is determined that the timer for period T2 is not running, and consequently step K is performed. At step K it is determined that the timer for period T3 is running. Step L is then performed which determines whether the timer has reached period T3. The loop of steps L,B,G and K is repeated until the timer T3 expires, at which point, at step M the uplink amplifier 38 is switched down, with its gain at zero, and returns to the monitoring state at step A.

The embodiment of the invention provides a mechanism for adjusting the gain of the repeater amplifier 38 so that the repeater 38 does not operate to provide continuous amplification. Compared to the prior art, this reduces interference and increases the capacity of the network. No special signaling to the uplink amplifier 38 is required to control the gain of the amplifier 38. Indeed, it would be very inconvenient for a user to have to manually set the gain of the amplifier 38, and would be impracticable to modify the cellular telecommunication Standards to include signaling to the uplink amplifier 38 to control its gain.

Highly advantageously, the embodiment exploits the operation of the known uplink inner loop power control to control the repeater gain. The uplink processor 40 monitors when a threshold Th1 indicative of an active communication session is exceeded for a time period T1, to set the amplifier to optimum (for example maximum) gain. The network and user of mobile terminal 1 then benefits from the improvements provided by the gain provided by the uplink amplifier 38 to the quality of the active communication session. In order to detect when the active communication session has terminated, the uplink amplifier 38 steps down its gain. During the active communication session this, by virtue of the known uplink power control inner loop mechanism, causes the mobile terminal to increase its transmit power. When the transmit power of the mobile terminal is increased such that the power measured at the antenna 28 exceeds the threshold Th1 for the time period T1, the gain is again returned to the optimum (for example, maximum) level. The cycle of stepping down the gain of the amplifier 38 is again repeated. Whilst the communication session is active, this stepping down of the gain will repeatedly cause the threshold Th1 to be exceeded for a period of T1, causing the gain of the amplifier 38 to revert to its optimum (maximum) value. Only after the active communication session has terminated will the stepping down of the gain of the uplink amplifier 38 not cause the measured power of the antenna 28 to exceed the threshold Th1 (as the uplink power control inner loop will no longer be operating). After the gain of the uplink amplifier 38 has been stepped down to zero and the threshold Th1 has not been crossed for a time period T1 over a longer time period T3 it can be assumed by the repeater processor 40 that the active communication session has terminated and the uplink amplifier can be switched down (returned to its monitoring state at zero gain).

During the active communication session the gain provided by the uplink amplifier 38 is not always at its optimum (maximum) value due to the stepping down operation. However, significant gain is generally always applied during the active communication session, thereby improving the quality of the communication session.

A further advantage of the embodiment is that the power consumption of the repeater is reduced, compared to a repeater that is always operated at the optimum (maximum) uplink gain.

The conventional definition of a repeater is an amplifier which receives weak signals and delivers corresponding stronger signals without re-shaping waveforms. The term "repeater" used in this specification is intended to include repeaters of this type.

Th2 100 may have a value defined relative to Th1, e.g. Th2=Th1-Δ (where Δ=constant in $10^{th}$ of dB).

The amount of the step down in gain may be a fixed value each time the time T2 is reached in step F. Alternatively, the step down=Existing Gain value/constant (which is between 1 and maximum gain value). Alternatively, the gain of the repeater could be reduced using any other appropriate function.

The relationship between T2 and T3 may be:

$$\text{Þ } T2+T3+\beta=\text{constant (in sec)}$$

where Þ and β=are constant.

In certain embodiments, the time T2 between reductions in the gain may vary.

In the embodiment described, if the noise level exceeds the Th1 threshold for period equal to T1, the gain immediately increases to the optimum or maximum value. Alternatively, the gain may be stepped up over a period of time. For example, in the first 10 ms the gain is increased by 10 dB, then in the next 10 ms the gain is increased by 2 dB, and in the subsequent 10 ms the gain is increased by 1 dB. The step size may decrease exponentially.

The repeated gain may increase by N*gain_step_size if the noise level exceeds the Th1 threshold for period equal to T1, where N is variable and gain_step_size is constant.

Figure 7:
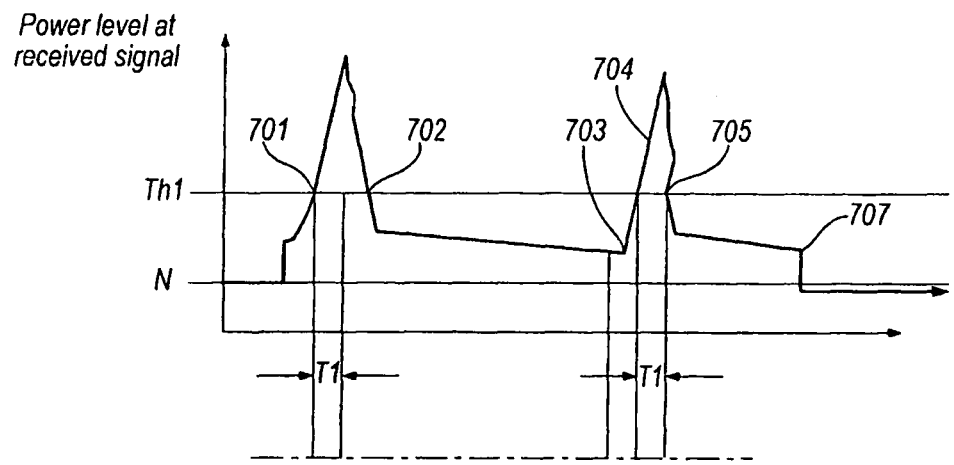
FIG. 7 is a graph showing received signal power at the repeater against time.
Figure 8:
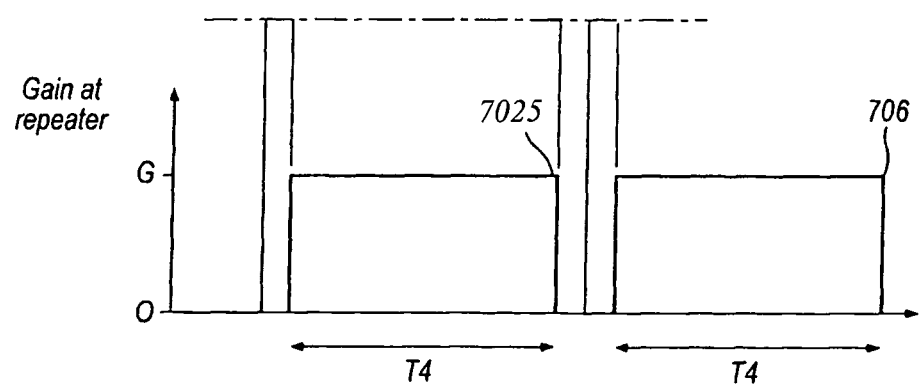
FIG. 8 is a graph showing repeater gain against time, the timescales of the graphs of FIG. 7 and FIG. 8 being the same.

FIGS. 7 and 8 show the power level of signals received at a repeater and the gain of the repeater in a further embodiment of the invention in which the repeater amplifier is set to a fixed gain when activated. In such embodiments, when the repeater is activated it is set to a fixed gain G for a predefined time period T4. On expiry of the time period the repeater is deactivated.

The repeater is activated when it detects a signal having a strength over the threshold Th1 for time T1 in the same way as the embodiments discussed above. The repeater activates in the same way as those embodiments discussed above. At 701 it detects a signal above power level Th1 and the repeater starts its timer. If the received signal remains at power above Th1 for time T1 it activates at 702 and sets its gain to its operating gain G for time period T4, as shown in FIG. 8. On expiry of time period T4 at 7025, the repeater is deactivated and returns to its monitoring mode.

Deactivation of the repeater will result in the strength of the signal received at the network being reduced since it is no longer being amplified by the repeater. In general, this will decrease the SIR. This is detected by the uplink power control loop (as discussed above with reference to FIG. 2) and, as discussed above, steps are taken to instruct the mobile to increase power. Specifically, when the estimated SIR of the received uplink is compared with the target SIP it will be determined that the estimated SIP of the uplink is below the target value. Consequently, TPC command is generated and sent in the downlink to cause the mobile terminal to increase its transmit power. Thus, at 703, the mobile increases its transmit power.

After the repeater is deactivated at 7025, it will analyze the power of received signals to determine if it receives signals above power threshold Th1 for time T1. At 704, the repeater detects the signal from the mobile device having power above Th1 and so, once again, it starts its timer to determine whether the received power level stays above Th1 for time T1. At 705, the repeater detects that the power has remained above Th1 for time period T1 and so it reactivates and sets its gain to G for time period T4. On expiry of T4, at 706, the repeater deactivates again.

As shown in FIG. 7, the call is terminated at 707 and the repeater receives only background noise. Since the call is no longer active, after deactivation of the repeater the repeater does not receive a signal having power level above Th1 and remains deactivated until a new call is detected.

In the embodiments of FIGS. 7 and 8, if the communication is ended while the repeater is active, after deactivation the repeater will not be reactivated until a further communication is commenced. However, if a communication is still active after the repeater is deactivated, the repeater is reactivated shortly after deactivation when the power of the detected signal is raised above Th1 for the predefined time period T4. Such embodiments reduce power consumption by remaining switched off until an active call is detected.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

The invention claimed is:

1. A method of operating a cellular telecommunications network base station repeater for a mobile terminal in a cellular telecommunications network, which network has a power control function which during an active communication tends to cause the mobile terminal uplink transmit power to vary in response to a variation in signal strength of an uplink signal associated with that mobile terminal received at the network, the method comprising:
   increasing gain of the repeater to cause the power control function to consequently instruct the mobile terminal to decrease the mobile terminal uplink transmit power, wherein the power control function instructs the mobile terminal individually to decrease the mobile terminal uplink transmit power of the mobile terminal independently of other mobile terminals in the cellular telecommunications network; and
   deactivating the repeater when a consequential decrease in the mobile terminal uplink power does not occur, wherein the deactivating of the repeater is automatically controlled at the repeater based on the mobile terminal uplink power monitored at the repeater not decreasing in response to increasing the gain of the repeater.

2. The method of claim 1, further comprising:
   activating the repeater in response to detection of a signal indicative of an active communication of the mobile terminal to amplify signals with a predetermined gain.

3. The method of claim 2, wherein the repeater is activated when strength of the detected signal exceeds a first signal level threshold for a time period of a first duration.

4. The method of claim 1, wherein the varying step includes progressively reducing the gain of the repeater.

5. The method of claim 4, wherein the progressive reduction of repeater gain is performed in a series of stepped reductions.

6. The method of claim 3, wherein said varying step includes maintaining the gain of the repeater at said predetermined gain until the strength of the detected signal falls below a second signal level threshold, and subsequently progressively reducing the repeater gain until the strength of the detected signal exceeds a third signal level threshold for a time period of a second duration.

7. The method of claim 6, wherein said first signal level threshold and said third signal level threshold have the same value.

8. The method of claim 6, wherein said time period of the first duration and said time period of the second duration are the same.

9. The method of claim 1, wherein the telecommunications network is a CDMA telecommunications network, and wherein the power control function is an inner loop uplink power control function.

10. A method of operating a cellular telecommunications network base station repeater for a mobile terminal in a cellular telecommunications network, which network has a power control function which, during an active communication, tends to cause the mobile terminal uplink transmit power to vary in response to a variation in signal strength of an uplink signal associated with that mobile terminal received at the network, the method comprising:
   where gain of the repeater is at a maximum gain value, decreasing the gain of the repeater so as to cause the power control function to instruct the mobile terminal to increase the mobile terminal uplink transmit power;
   subsequently measuring over a given time period the signal strength of the uplink signal received at the repeater;
   where the measured signal strength exceeds a signal level threshold over the given time period, thereby indicating that the active communication is still in progress, subsequently increasing the gain of the repeater, thereby reverting the gain of the repeater to the maximum gain value, wherein the power control function instructs the mobile terminal individually to decrease the mobile terminal uplink transmit power of the mobile terminal independently of other mobile terminals in the cellular telecommunications network; and
   deactivating the repeater based on lack of variations of the mobile terminal uplink power following varying gain of the repeater, wherein the deactivating of the repeater is automatically controlled at the repeater based on the variations in the mobile terminal uplink power monitored at the repeater.

11. A method of operating a cellular telecommunications network base station repeater for a mobile terminal in a cellular telecommunications network, which network has a power control function which during an active communication tends to cause the mobile terminal uplink transmit power to decrease in response to an increase in signal strength of an uplink signal associated with that mobile terminal received at the network and tends to cause the mobile terminal uplink transmit power to increase in response to a decrease in the signal strength of the uplink signal associated with that mobile terminal received at the network, the method comprising:

activating the repeater in response to detection of a signal indicative of an active communication of the mobile terminal to amplify the signal with a predetermined gain;

reducing the gain of the repeater so that, as a consequence, the power control function causes the mobile terminal to increase the mobile terminal uplink transmit power during the active communication, wherein the power control function instructs the mobile terminal individually to increase the mobile terminal uplink transmit power of the mobile terminal independently of other mobile terminals in the cellular telecommunications network; and detecting the absence of the increase in mobile terminal uplink transmit power as an indication that the communication is no longer active and in response to the detection deactivating the repeater, wherein the deactivating of the repeater is automatically controlled at the repeater based on the mobile terminal uplink power monitored at the repeater not increasing in response to decreasing the gain of the repeater.

12. A base station repeater for a mobile terminal in a cellular telecommunications network, which network has a power control function which during an active communication tends to cause the mobile terminal uplink transmit power to vary in response to a variation in signal strength of an uplink signal associated with that mobile terminal received at the network, the repeater comprising:

a varying device that increases gain of the repeater to cause the power control function to consequently instruct the mobile terminal to decrease the mobile terminal uplink transmit power, wherein the power control function instructs the mobile terminal individually to decrease the mobile terminal uplink transmit power of the mobile terminal independently of other mobile terminals in the cellular telecommunications network; and a deactivating device that deactivates the repeater when a consequential decrease in the mobile terminal uplink power does not occur, wherein the deactivating of the repeater is automatically controlled at the repeater based on the mobile terminal uplink power monitored at the repeater not decreasing in response to increasing the gain of the repeater.

13. The repeater of claim 12, further comprising:

an amplifier, responsive to detection of a signal indicative of an active communication of the mobile terminal, that amplifies signals with a predetermined gain.

14. The repeater of claim 13, wherein the amplifier is activated when the detected signal exceeds a first signal level threshold for a time period of a first duration.

15. The repeater of claims 12, wherein the varying device is operable to progressively reduce the gain of the repeater.

16. The repeater of claim 15, wherein the progressive reduction of the gain of the repeater is performed in a series of stepped reductions.

17. The repeater of claim 14, wherein said varying device is operable to maintain the gain of the repeater at said predetermined gain until the detected signal falls below a second signal level threshold, and subsequently is operable to progressively reduce the gain of the repeater until the detected signal exceeds a third signal level threshold for a time period of a second duration.

18. The repeater of claim 17, wherein said first signal level threshold and said third signal level threshold have the same value.

19. The repeater of claim 17, wherein said time period of the first duration and said time period of the second duration are the same.

20. The repeater of claim 12, wherein the telecommunications network is a CDMA telecommunications network, and wherein the power control function is an inner loop uplink power control function.

21. A base station repeater for a mobile terminal in a cellular telecommunications network, which network has a power control function which, during an active communication, tends to cause the mobile terminal uplink transmit power to vary in response to a variation in signal strength of an uplink signal associated with that mobile terminal received at the network, the repeater comprising:

a gain decreasing device that decreases gain of the repeater, including at a point in time where the gain of the repeater is at a maximum gain value so as to cause the power control function to instruct the mobile terminal to increase the mobile terminal uplink transmit power;

a measurement device configured to subsequently measure over a given time period the signal strength of the uplink signal received at the repeater;

a gain increasing device that, where the measured signal strength exceeds a signal level threshold over the given time period, thereby indicating that the active communication is still in progress, subsequently increases the gain of the repeater, thereby reverting the gain of the repeater to the maximum gain value, wherein the power control function instructs the mobile terminal individually to decrease the mobile terminal uplink transmit power of the mobile terminal independently of other mobile terminals in the cellular telecommunications network; and a deactivating device that deactivates the repeater when the consequential variation in the mobile terminal uplink power does not occur following varying gain of the repeater, wherein the deactivating of the repeater is automatically controlled at the repeater based on the variations in the mobile terminal uplink power monitored at the repeater.

22. A base station repeater for a mobile terminal in a cellular telecommunications network, which network has a power control function which, during an active communication, tends to cause the mobile terminal uplink transmit power to decrease in response to an increase in signal strength of an uplink signal associated with that mobile terminal received at the network and tends to cause the mobile terminal uplink transmit power to increase in response to a decrease in the signal strength of the uplink signal associated with that mobile terminal received at the network, the repeater comprising:

an activating device that activates the repeater in response to detection of a signal indicative of an active communication of the mobile terminal to amplify the signal with a predetermined gain;

a gain reducing device that reduces gain of the repeater so that, as a consequence, the power control function causes the mobile terminal to increase the mobile terminal uplink transmit power during the active communication; and a detecting device that detects an absence of the increase in the mobile terminal uplink transmit power as an indication that the communication is no longer active and, in response to the detection, deactivates the repeater, wherein the power control function instructs the mobile terminal individually to increase the mobile terminal uplink transmit power of the mobile terminal independently of other mobile terminals in the cellular telecommunications network, and wherein the deactivating of the repeater is automatically controlled at the repeater based on the mobile terminal uplink power monitored at the repeater not increasing in response to decreasing the gain of the repeater.

* * * * *